Sept 17, 1957  H. M. GEYER  2,806,383
ACTUATOR ASSEMBLY
Filed March 4, 1955

INVENTOR.
HOWARD M. GEYER
BY
Craig V. Morton
ATTORNEY

United States Patent Office 2,806,383
Patented Sept. 17, 1957

2,806,383

ACTUATOR ASSEMBLY

Howard M. Geyer, Dayton, Ohio, assignor to General Motors Corporation, Detroit, Mich., a corporation of Delaware Application March 4, 1955, Serial No. 492,253

7 Claims. (Cl. 74—424.8)

This invention pertains to actuators, and particularly to electro-mechanical linear actuators.

Heretofore, electro-mechanical actuators of the type including a reversible electric motor, a rotatable screw shaft drivingly connected thereto, and a nonrotatable, reciprocable nut connected with the screw shaft, have been devised for positioning various load devices. A linear actuator of this type is shown in the Farmer Patent 1,416,182. However, it has been observed that when actuators of this type are subjected to heavy compressive loads, the screw shaft has a tendency to bend or deflect. The present invention relates to an actuator of this type wherein the screw shaft is always subjected to a tension load irrespective of the direction of the applied load, thereby preventing undesirable screw shaft deflection. Accordingly, among my objects are the provision of an actuator having a rotatable screw shaft including means for applying a tension load to said shaft; and the further provision of screw shaft supporting means whereby a tension load will be imposed upon said shaft irrespective of the direction of the applied load.

The aforementioned and other objects are accomplished in the present invention by supporting the screw shaft at axially spaced points along its length, which supports resist axial movement of the screw shaft in opposite directions. Specifically, the actuator includes a reversible electric motor that is drivingly connected with the screw shaft through a planetary gear set. The planetary gear set is disposed within a housing, a tubular member having a diametrically slotted intermediate portion being attached to the gear housing. One end of the screw shaft is rotatably journaled in a bearing carried by one end of the tubular member. This end of the screw shaft has a shoulder thereon constituting a thrust collar which prevents axial movement of the screw shaft in one direction due to engagement with the inner bearing race.

The other end of the screw shaft is rotatably journaled in a bearing carried by the other end of the tubular member. Similarly, a thrust collar is fastened to this end of the shaft, the thrust collar abutting the inner bearing race to prevent axial movement of the shaft in the opposite direction. The screw shaft threadedly engages a nut through the agency of a plurality of circulating balls. The nut is formed with a pair of radially extending trunnions that project through the slotted tubular member so as to prevent rotation thereof.

The actuator housing is attached to a fixed support while the nut is attached to a movable load device. Accordingly, upon rotation of the screw shaft, linear movement will be imparted to the nut and the load device. By reason of the thrust collar supporting arrangement of the screw shaft, it is always subjected to a tension load, and, therefore, will not bend. All bending loads are carried by the torque resisting, tubular member.

Further objects and advantages of the present invention will be apparent from the following description, reference being had to the accompanying drawing wherein a preferred embodiment of the present invention is clearly shown.

Figure 1:
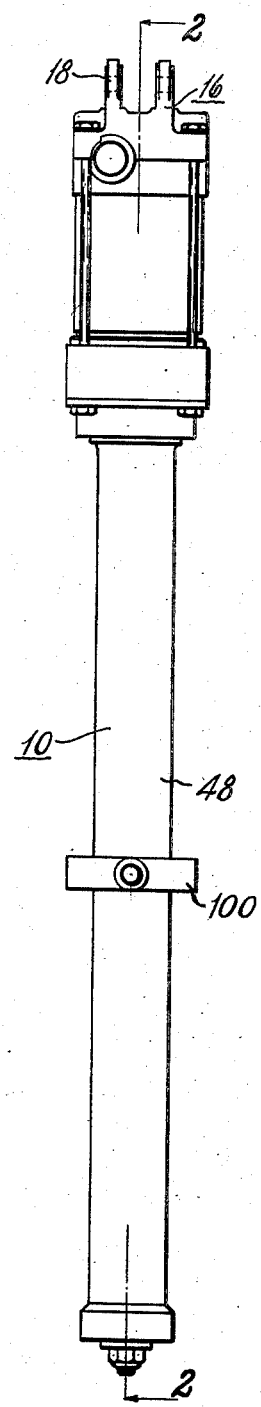
Fig. 1 is a plan view of an actuator constructed according to this invention.

With particular reference to the drawing, an electric motor driven actuator of the linear type is generally depicted by the numeral 10. The actuator 10 includes a reversible electric motor 12 disposed in a motor housing 14. One end of the motor housing 14 is connected to an end cap 16 having an integral clevis 18 that may be connected to a fixed support, not shown. The motor 12 includes a field winding 20 and an armature 22. The armature includes a shaft 24, which is rotatably journaled by ball bearings 26 and 28.

The armature shaft 24 is keyed at 30 to a driving member 32 of a magnetic clutch, designated generally by the numeral 34. An electro-magnetic winding 36 is disposed within the motor housing 14, which winding is energized concurrently with energization of the motor 12.

The magnetic clutch 34 also includes a driven plate member 37, which is connected by straight splines 38 to a stub shaft 40. The plate 37 is composed of magnetic material and is normally urged downwardly, as viewed in Fig. 2, by a spring 42. The stub shaft 40 is rotatably journaled by ball bearing 44, which is carried by a gear box housing 46. Upon energization of the electric motor 12 and the winding 36, the plate 37 will move upwardly, as viewed in Fig. 2, whereby rotation of the driving member 32 will be imparted to the driven member 37 and to the stub shaft 40.

Figure 2:
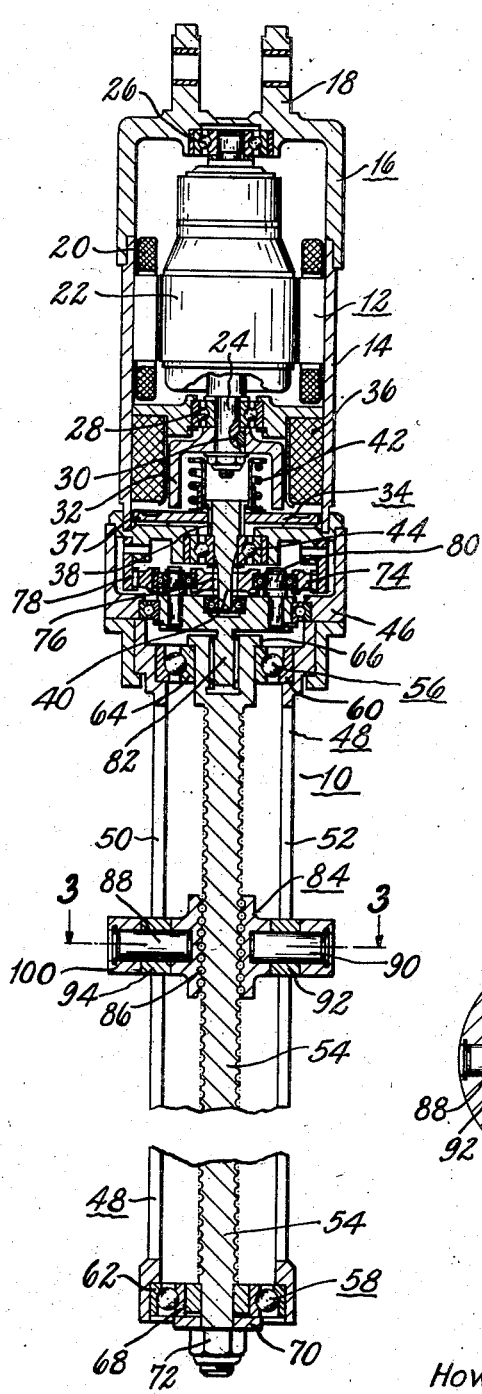
Fig. 2 is an enlarged sectional view taken along line 2—2 of Fig. 1.
Figure 3:
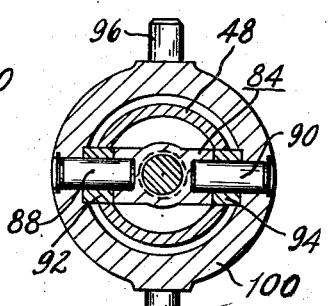
Fig. 3 is a sectional view taken along line 3—3 of Fig. 2.

A torque resisting tubular member 48 is rigidly connected to the gear box housing 46. The tubular member 48 is formed with a pair of diametrically opposed slots 50 and 52 throughout a portion of its length, as indicated in Fig. 2. A screw shaft 54 is rotatably journaled on opposite ends by ball bearings 56 and 58. The outer races 60 and 62, respectively, of the ball bearings 56 and 58 are carried by the tubular member 48. The inner race 64 of ball bearing 56 abuts an integral thrust collar 66 formed on one end of the screw shaft 54. The inner race 68 of the ball bearing 58 abuts a thrust collar 70, which is carried by the shaft 54 and maintained in assembled relation by means of a nut 72.

The screw shaft 54 is drivingly connected with the stub shaft 40 through a planetary gear set depicted generally by the numeral 74. The planetary gear set includes a sun gear 76, which is connected to the stub shaft 40, a stationary ring gear 78 and a plurality of planet pinions 80. The planet pinions 80 are carried by a spider 82, which is drivingly connected with the screw shaft 54.

The screw shaft 54 threadedly engages a reciprocable nut 84 through the agency of a plurality of circulating balls 86. The ball screw and nut arrangement is of conventional design, and, thus, the balls 86 are free to circulate in a nut passage, not shown, during rotation of the screw shaft 54. In order to prevent rotation of the nut 84 so that rotation of the screw shaft 54 will impart linear movement thereto, the nut carries a pair of diametrically opposed, radially extending trunnions 88 and 90, which are enclosed by sleeve assemblies 92 and 94, respectively. The trunnions and sleeve assemblies project through the slots 50 and 52 of the tubular member 48 and, thus, prevent rotation of the nut 84. The load device to be positioned, not shown, is connected to trunnions 96 and 98 carried by ring 100.

If the load connected to the trunnions 96 and 98 acts downwardly, as viewed in Fig. 2, the thrust load imposed upon the screw shaft 54 will be supported by the thrust collar 66 and the inner race 64 of the bearing 56. Thus, the screw shaft 54 will be maintained under tensional loading by the thrust collar support. Conversely, if the load connected to trunnions 96 and 98 acts upwardly, as viewed in Fig. 2, the thrust load imposed upon the screw shaft 54 will be supported by thrust collar 70 and the inner race 68 of bearing 62. Thus, irrespective of the direction of the applied load, the screw shaft will at all times be maintained under a tension load. By virtue of this tension loading of the screw shaft, bending or deflection thereof under high loading is precluded. All bending loads to which the actuator may be subjected are supported by the rigid torque tube 48.

While the embodiment of the present invention as herein disclosed, constitutes a preferred form it is to be understood that other forms might be adopted.

What is claimed is as follows:

1. In an actuator of the type including, a rotatable screw shaft and a nut threadedly connected therewith and restrained against rotation whereby rotation of the screw shaft will impart linear movement to the nut, means for imposing a tension load on said screw shaft irrespective of the direction of the load applied to said nut including, means including a rigid torque tube rotatably journaling said screw shaft adjacent opposite ends thereof, a thrust collar at one end of said screw shaft for withstanding thrust loading in one direction, and a thrust collar at the other end of said screw shaft for withstanding thrust loading in the opposite direction.

2. An electro-mechanical linear actuator including, in combination, an electric motor, a gear box housing, reduction gearing disposed in said housing and drivingly connected with said motor, a rigid tube connected to said gear box housing, a screw shaft rotatably journaled in said tube, said screw shaft being drivingly connected with said motor through said reduction gearing, a nut threadedly engaging said screw shaft, means precluding rotation of said nut whereby rotation of said screw shaft will effect linear movement of said nut, and means supporting said screw shaft whereby irrespective of the direction of load applied to said nut, said screw shaft will be maintained under tension.

3. The actuator set forth in claim 2 wherein said screw shaft is rotatably journaled in said tube by a pair of spaced ball bearing assemblies, and wherein said last recited means comprises thrust collars adjacent the ends of said screw shaft which coact with the inner races of said ball bearings so as to withstand thrust loading in opposite directions.

4. The actuator set forth in claim 2 wherein said tube includes at least one longitudinally extending slot, and wherein the means for precluding rotation of said nut comprises an extension of said nut which is disposed within the slot of said tube.

5. The actuator set forth in claim 2 wherein said tube includes a pair of longitudinally extending, diametrically opposed slots, and wherein the means for precluding rotation of said nut comprises a pair of trunnions connected to said nut and extending through said slots.

6. An electromechanical actuator comprising, in combination, a motor housing, a reversible electric motor therein, a clutch operably disposed with said motor, a gear box housing including gearing rotatable therein connected with said clutch, a torque tube having a longitudinally extending slot attached to said gear box housing, a screw shaft rotatably journalled at opposite ends of said torque tube, unidirectional thrust supporting means between said shaft and said tube, a driving connection between one end of said shaft and said gearing, a nut threadedly engaging said screw shaft, a trunnion carried by said nut extending through the longitudinal slot of said torque tube, and a ring connectible to a load attached to said trunnion encompassing said torque tube, said torque tube supporting all bending load to which said actuator may be subjected assuring tension loading of said screw shaft.

7. An electromechanical actuator comprising, in combination, a ring having a diametrically opposite pair of trunnions extending radially outwardly thereon connectible to an actuator load, a torque tube slotted at diametrically opposite sides and encircled by said ring, a screw shaft rotatably journalled in said tube, a ball bearing assembly between corresponding ends of said tube and said shaft, a thrust collar extending radially outwardly at opposite ends of said shaft coacting with each respective bearing assembly withstanding thrust loading of said screw in opposite directions, a nut in threaded engagement with said shaft, a pair of radial trunnions connecting said nut through the diametrically opposite slots of said torque tube with said ring at an axis transverse to said load trunnions, a gear box including gearing therein operably connected to said screw shaft, said gear box being attached to said torque tube, a housing rigidly attached with said gear box, and a reversible electric motor with a cooperable clutch operatively disposed therein connected with said gearing, said torque tube supporting all bending loads to which said actuator may be subjected maintaining tension load through said ring on said screw shaft irrespective of the direction of applied load.

References Cited in the file of this patent

UNITED STATES PATENTS

| | | |
|---|---|---|
| 838,681 | Burrowes | Dec. 18, 1906 |
| 1,051,673 | Brackenbury | Jan. 28, 1913 |
| 1,416,182 | Farmer | May 16, 1922 |
| 1,870,793 | Collins | Aug. 9, 1932 |
| 2,169,351 | Bednarek | Aug. 15, 1939 |
| 2,307,975 | Walter | Jan. 12, 1942 |
| 2,315,942 | Deist | Apr. 6, 1943 |
| 2,479,019 | Ochtman | Aug. 16, 1949 |
| 2,508,281 | Miller | May 16, 1950 |
| 2,639,625 | Geyer | May 26, 1953 |
| 2,642,752 | Geyer | June 23, 1953 |

FOREIGN PATENTS

| | | |
|---|---|---|
| 102,323 | Australia | Oct. 22, 1937 |
| 626,751 | Great Britain | July 20, 1949 |